United States Patent [19]

Hall et al.

[11] Patent Number: 4,592,430

[45] Date of Patent: Jun. 3, 1986

[54] FLUID-PRESSURE OPERATED TOOLS

[75] Inventors: Raymond J. Hall; Ian S. Burton, both of Buckinghamshire, England

[73] Assignee: Compair Power Tools Limited, Buckinghamshire, England

[21] Appl. No.: 556,380

[22] Filed: Nov. 30, 1983

[30] Foreign Application Priority Data

Dec. 3, 1982 [GB] United Kingdom ................. 8234562
Jul. 28, 1983 [GB] United Kingdom ................. 8320382

[51] Int. Cl.[4] .................................... B23P 19/00
[52] U.S. Cl. .................................... 173/12; 173/163
[58] Field of Search .................... 173/12, 163; 91/59, 91/33

[56] References Cited

U.S. PATENT DOCUMENTS 3,791,459 2/1974 Workman ............................ 173/12
4,154,308 5/1979 Goldsberry et al. ................. 173/12

FOREIGN PATENT DOCUMENTS 2626493 12/1976 Fed. Rep. of Germany .
3233962 3/1983 Fed. Rep. of Germany .
1136810 12/1968 United Kingdom .
1232994 5/1971 United Kingdom .
1375102 11/1974 United Kingdom .
2098528 11/1982 United Kingdom .

*Primary Examiner*—James M. Meister
*Assistant Examiner*—John L. Knoble
*Attorney, Agent, or Firm*—Watson, Cole, Grindle & Watson

[57] ABSTRACT

A tool has a housing, a reversible fluid-pressure operated rotary motor which is arranged to drive a bit holder via reduction gear boxes and a clutch which is designed to slip at a predetermined torque. When a trigger is pressed, pressure air is delivered via a valve to the motor, and in a first position of the valve the motor is driven in a forward direction. When the predetermined torque is reached, the clutch slips and displaces an actuator which opens another valve. This in turn creates a pressure differential across the valve which causes it to move to its second position in which pressure air is delivered to the motor to drive it in the reverse direction. When the trigger is released, the valves return to their original positions.

15 Claims, 6 Drawing Figures

FLUID-PRESSURE OPERATED TOOLS

BACKGROUND OF THE INVENTION

The invention relates to a fluid-pressure operated tool.

GB-A-No. 2098528 shows a power tool which has a mechanism for automatically reversing the direction of rotation of its motor at a certain torque, the mechanism including an actuator which allows a valve to close at the predetermined torque. This mechanism is complicated and the actuator does not positively displace the valve to reverse the motor at the predetermined torque.

SUMMARY OF THE INVENTION

According to the invention there is provided a fluid-pressure operated tool comprising a housing having a reversible fluid pressure operated rotary motor, a bit holder, a clutch for delivering drive from the motor to the bit holder which clutch is arranged to slip at a predetermined torque, first valve means movable between a first position in which pressure fluid is supplied to the motor to cause rotation thereof in a forward direction and a second position in which pressure fluid is supplied to the motor to cause rotation thereof in the reverse direction, a chamber defined between said first valve means and said housing, the first valve means being hold in its first position by fluid pressure in said chamber and a second valve means, normally closed but movable to an open position to relieve said fluid pressure to allow the first valve means to move to its second position whereby rotation of the motor is reversed, and actuating means arranged between a part of the clutch and the second valve means, the actuating means being displaced to open the second valve means when the clutch acts to disengage the drive from the motor to the bit holder. The actuating means is preferably in the form of a push rod, and the push rod is preferably mounted coaxially with the motor, clutch and bit holder.

The first valve means is preferably urged towards its second position by virtue of a pressure differential across it, and there may also be spring biassing means. The first valve means preferably has a body slidably mounted within the housing, the body and housing defining the chamber. The second valve means is preferably housed within the body of the first valve means and the second valve means is preferably urged towards its closed position by means of spring bias. The clutch is preferably in the form of a pair of jaws having profiled teeth, one jaw being urged towards the other by means of spring bias, the jaws of the clutch slipping at a predetermined torque, said slip causing axial movement of one of the clutch jaws against the spring bias. The tool preferably further comprises means for venting the said chamber to atmosphere when the first valve mans is in its second position. The tool may incorporate a pistol grip with a manually-operable trigger to operate the tool. Alternatively, the tool may be straight-handled and operated by means of a lever. If the tool is straight-handled, the control valve may be arranged parallel to the tool with air supply and exhaust also arranged parallel, or the contact valve may be arranged at right angles to the tool, in which case the exhaust may be via a silencer through vents in the side of the tool.

DESCRIPTION OF THE DRAWINGS

By way of example, three embodiments of the present invention, and modifications thereto, will now be described with reference to the drawings, in which.

DETAILED DESCRIPTION OF THE PREFERRED EMBODIMENTS

Figure 1:
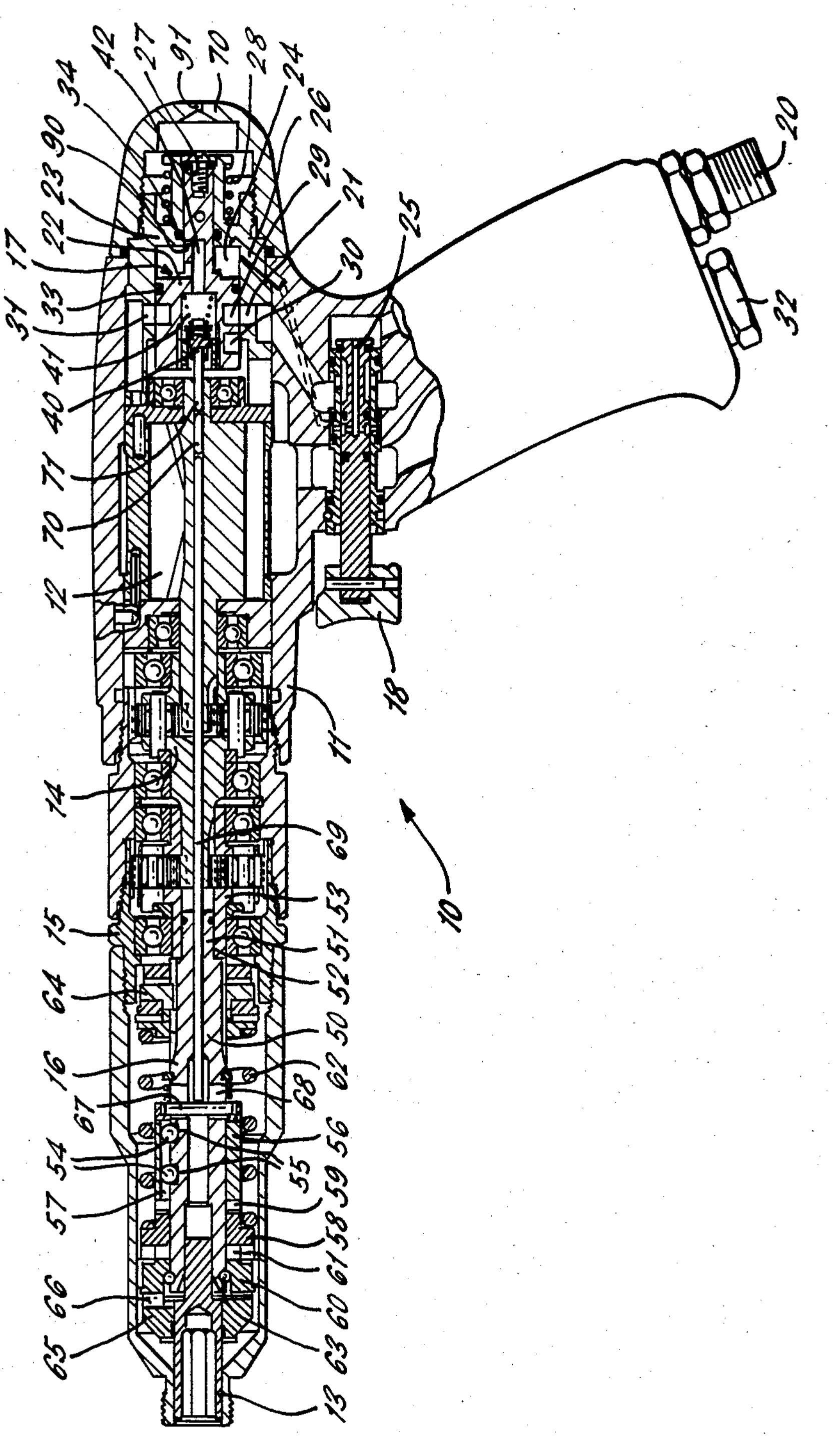
FIG. 1 is a section through a tool according to the invention.

A fluid-pressure operated tool 10 according to the present invention is shown in FIG. 1. The tool 10 comprises a housing 11 in which is mounted a reversible sliding vane type air motor 12. The motor 12 is arranged to drive a spindle 13 through conventional epicyclic reduction gear boxes 14 and 15 and a clutch 16, which is arranged to slip as hereinafter described when a predetermined torque is reached. Pressure air is delivered to the motor 12 selectively by means of a valve arrangement 17, and the supply of pressure air to the tool is controlled by a hand-operated trigger valve 18. The tool shown in FIG. 1 has a pistol grip. The tool 10 is particularly intended for the job of anchoring threaded fasteners in sheet metal. This requires a driven threaded bit, which can be mounted in the spindle 13 by means of a suitable bit holder, to be engaged in the threaded bore of the fastener. The threaded bit is rotated forwardly until the clutch starts to slip, which indicates that the fastener is anchored in position. At this point, the motor is reversed, drawing the bit out of the fastener. For conventional right hand threaded fasteners, forward rotation is clockwise as viewed from the back of the tool, and reverse rotation is therefore anticlockwise. The tool can be connected to a source of compressed air, herein referred to as pressure air, via an inlet nipple 20 situated in the handle of the tool. The valve arrangement 17 comprises a valve body 22 which is slidably mounted in a valve bush 23 in the housing 11, and which is sealed by means of 'O' rings 33 and 34. Pressure air reaches the valve arrangement 17 via a port 21 in the valve bush 23 when the trigger valve 18 is depressed. A chamber 24 is defined between the valve body 22 and the valve bush 23, and this chamber 24 is pressurised via a port 25 in the trigger valve 18 and a conduit 26 in the valve bush 23. The air pressure in chamber 24 urges the valve body 22 to move into a first end position in which a flange at the end of the valve body 22 abuts against a shoulder 27 on the valve bush 23, as shown in FIG. 1. A spring 28 is arranged to urge the valve body 22 away from its first end position to the opposite end position. The valve body 22 has a pair of external grooves 29 and 30. When the valve body 22 is in its first end position, port 21 aligns with groove 29 which in turn is arranged to align with a further port 31 in the valve bush 23, port 31 communicating with the motor 12 for drive in the forward direction. At the same time in this first end position, groove 30 communicates with the exhaust port of the motor for scavenging, the air being exhausted to outlet nipple 32.

A further valve 40 is situated within the valve body 22, the valve 40 being held normally closed, as shown in FIG. 1, against its seat by a spring 41. If valve 40 is opened, pressure air in chamber 24 is able to exhaust through a passage 42 in the valve body 22 to atmosphere via outlet nipple 32. When valve 40 is opened, with the effect of the exhaust air pressure from the motor acting on the front face of the valve body 22 and the reduction of the pressure within the chamber 24, a net force acts on the valve body 22 urging it towards its opposite end position. The valve body 22 is additionally urged towards its opposite end position by the biasing action of spring 28. In the opposite end position, port 21 aligns with groove 30 which in turn is arranged to align with a further port in the valve bush communicating with the motor 12 for drive in the reverse direction. At the same time in this opposite end position, groove 29 now communicates with what was previously the inlet port of the motor for scavenging, the air being exhausted through outlet nipple 32 as before.

The clutch 16 of the tool comprises a shaft 50 having a square end 51 which engages in and is driven by a square bore 52 located in planet gear 53 of gear box 15. Three pairs of balls 54 are located in three pairs of blind holes 55 drilled into shaft 50, the pairs of holes being equispaced around the circumference of the shaft 50. A sleeve 56 fits over shaft 50, the sleeve having three axial grooves 57 in which are engaged the pairs of balls 54. Sleeve 56 is thus driven to rotate together with shaft 50 but is free to move axially independently of shaft 50. Sleeve 56 drives clutch jaw 58 via a set of matching dogs 59, and clutch jaw 58 in turn drives master jaw 60 via a set of matching teeth 61 which are profiled so that the working faces of the teeth are angled to form ramps. A spring 62 urges clutch jaw 58 towards master jaw 60 which rests against a thrust race 63. The spring rate of spring 62 can be altered by means of a threaded nut and collar type adjuster 64 for determining the torque at which the clutch will slip. The master jaw 60 drives the spindle 13 via a collar 65 and a set of matching dogs 66. When the torque applied to the master jaw 60 by the clutch jaw 58 exceeds a predetermined level, the profiled teeth 61 begin to slip. Since master jaw 60 is axially fixed by its thrust race 63, clutch jaw 58 is forced to move away from the master jaw 60 against the bias of spring 62 when slip occurs. This movement also moves sleeve 56 which in turn displaces a pin 67 which is located in a transverse slot 68 in shaft 50. A series of push rods 69, 70 and 71 are arranged between the pin 67 and valve 40 so that when pin 67 is displaced, the pushrods 69, 70 and 71 cause valve 40 to open which, as described earlier, allows valve body 22 to move to its opposite end position leading to a reversal of the direction of rotation of the motor 12.

Figure 2:
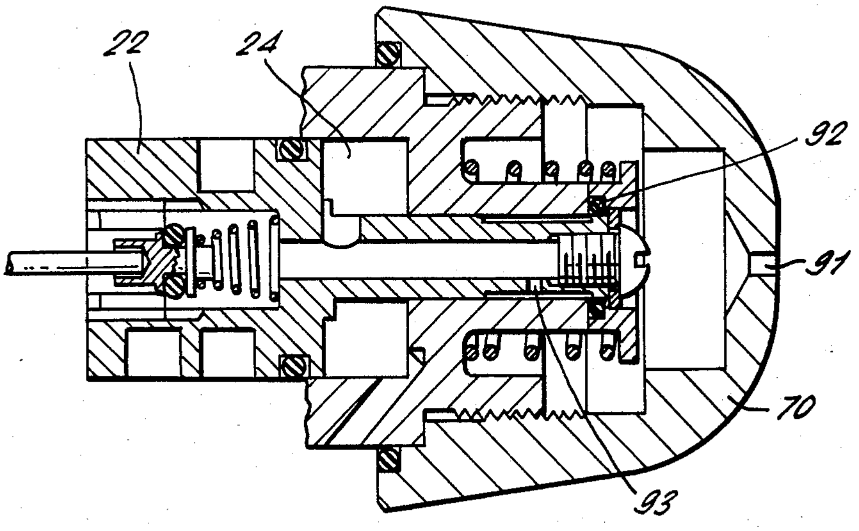
FIG. 2 is a section through a modified end portion of the tool of FIG. 1.
Figure 3:
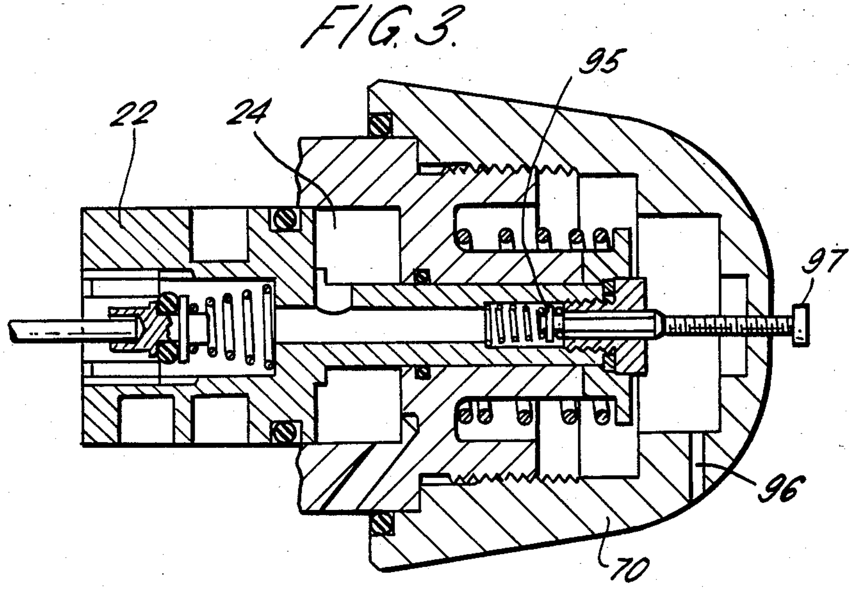
FIG. 3 is a section through a further modified end portion of the tool of FIG. 1.

In order to ensure that the air in chamber 24 stays at a sufficiently reduced level after valve 40 has been sprung open by the action of pushrods 69, 70 and 71, a bleed hole 90 is provided in the valve body 22. This bleed hole 90 communicates with chamber 24 via a passage 42 and when it passes 'O' ring seal 34, is open to atmosphere through a small orifice 91 in end cap 70. An alternative arrangement for this chamber bleed is shown in FIG. 2. Here, pressure is maintained in chamber 24 when the valve body 22 is in its first end position by means of an 'O' ring seal 92. As soon as the valve body 22 moves towards its opposite end position, pressure air in chamber 24 is allowed to vent to atmosphere via bleed hole 93 and orifice 91 in end cap 70. Another alternative arrangement for the chamber bleed is shown in FIG. 3. Here, pressure is maintained in chamber 24 when the valve body 22 is in its first end position by a small valve 95 which is held normally closed by spring bias. As soon as the valve body 22 moves towards its opposite end position, valve 95 is lifted off its seat allowing pressure air from chamber 24 to vent to atmosphere through orifice 96 in end cap 70. The position at which the valve 95 opens in this embodiment can be altered by means of a threaded adjuster 97.

In order to reset the tool after it has been used to anchor a fastener in position, the trigger valve 18 is released so that it returns to the position shown in FIG. 1. Once again, pressure air feeds via port 25 in the trigger valve 18 and conduit 26 in the valve bush 23 to the back of the valve body 22. It is arranged that conduit 26 is considerably larger than bleed hole 90 so that the chamber 24 can pressurise and move the valve body back to its first position whilst compressing spring 28. Now if the tool is to be used again, the trigger valve 18 is depressed and the cycle can repeat.

Figure 4:
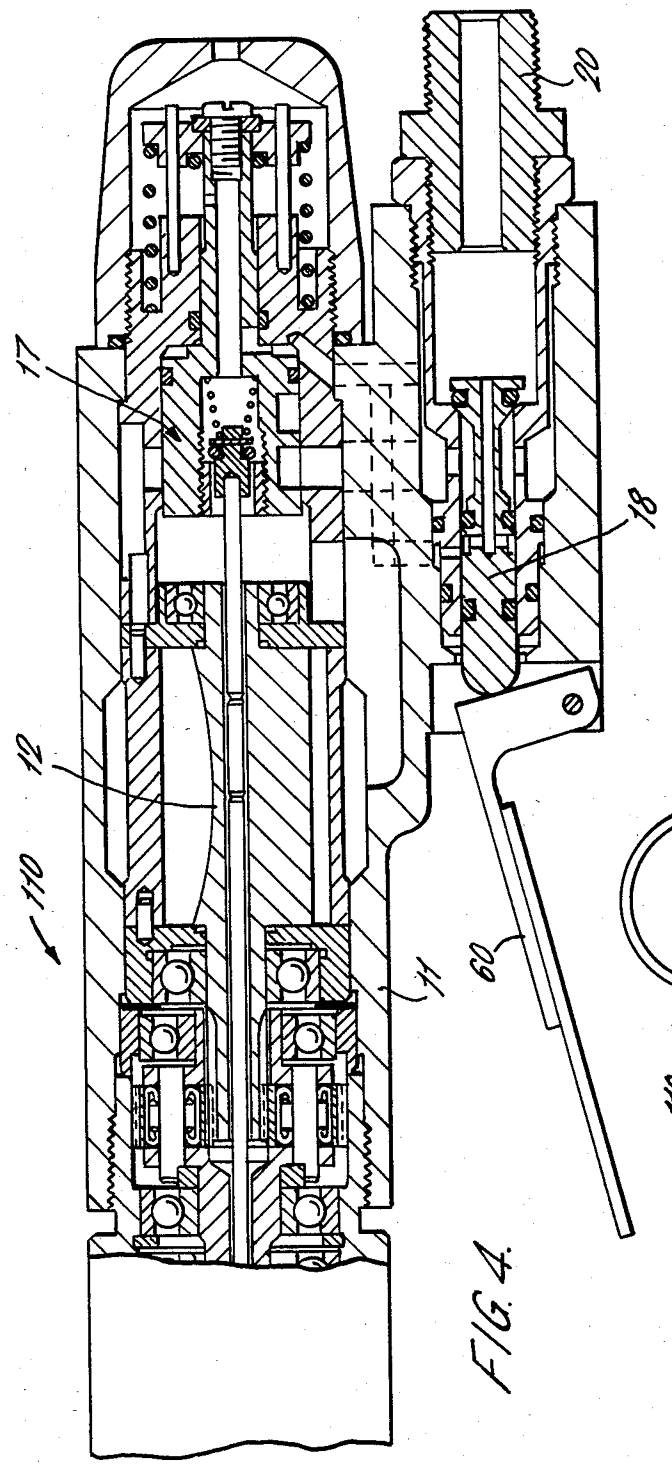
FIG. 4 is a part sectional view through another embodiment of a tool according to the invention.
Figure 5:
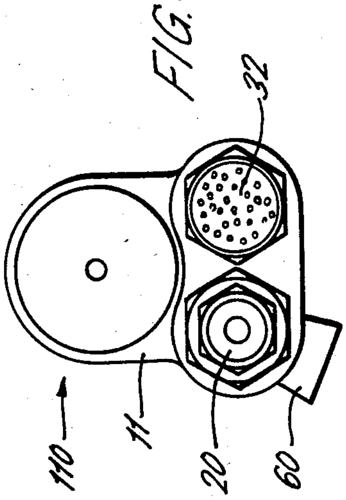
FIG. 5 is an end view of the tool of FIG. 4.

Another embodiment of a fluid-pressure operated tool 110 according to the invention is shown in FIGS. 4 and 5, and for ease of reference, like parts have been designated the same numerals. Here, just as in the tool 10 described above, the tool 110 incorporates a valve arrangement 17 which acts automatically to reverse the direction of rotation of the motor 12 when a predetermined torque is reached. The valve arrangement 17 of this tool 110 is exactly the same as that of the tool 10 described above, and as the tools function in an identical fashion, a description of the mode of operation will not be repeated.

The difference between the tools is essentially one of design and, instead of there being a pistol grip and a trigger for operating the control valve 18, as in the tool 10, the tool 110 has a straight handle and the control valve 18 is operated by means of a lever 60 which is pivotably mounted on the housing 11. To allow this straight-handled design, the inlet nipple 20 and exhaust nipple 32 of the tool are arranged parallel to the body of the tool 110 alongside the rearward portion thereof. The rearward portion of the tool rests comfortably in the palm of the hand, leaving the fingers free to operate the lever 60.

Figure 6:
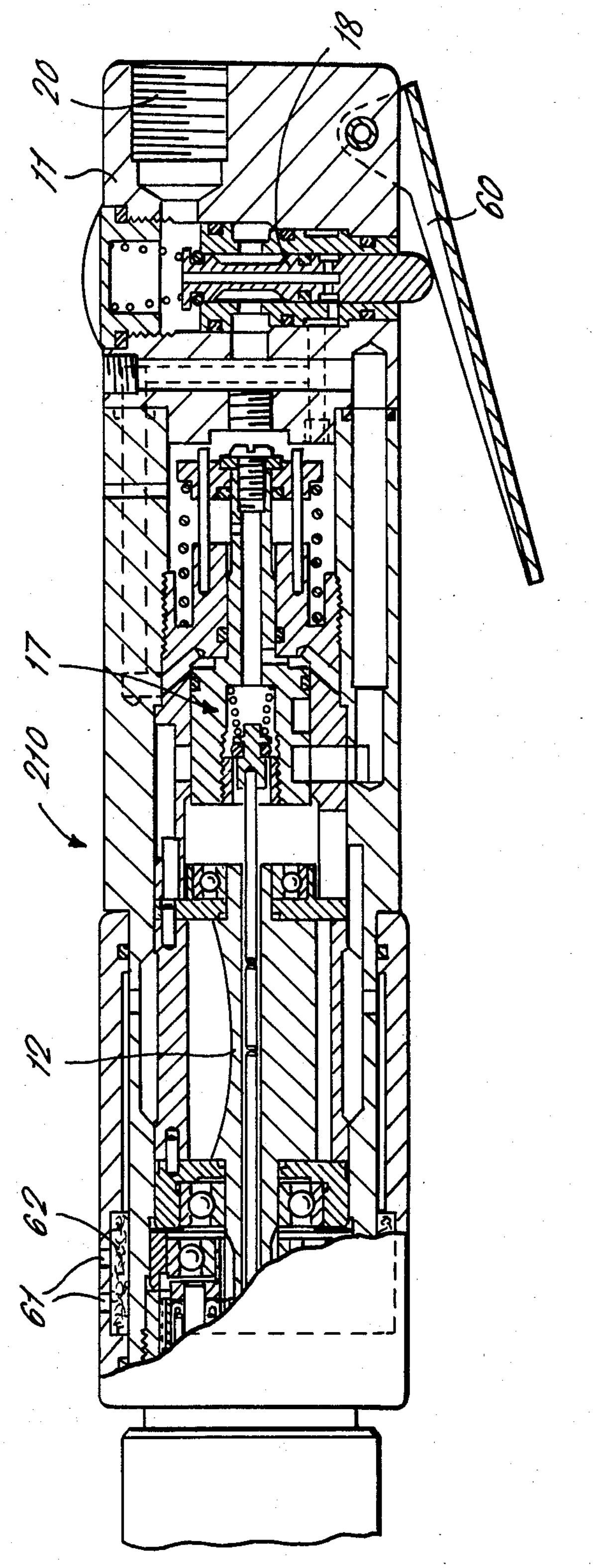
FIG. 6 is a part sectional view through a further embodiment of a tool according to the invention.

A further embodiment of a fluid pressure operated tool 210 is shown in FIG. 6. The tool 210 is also essentially the same as the tools 10 and 110 described earlier, and like parts have again been designated the same numerals. Again, the tool 210 incorporates a valve arrangement 17 which acts automatically to reverse the direction of rotation of the motor 12 when a predetermined torque is reached. As the mode of operation of the tool is again identical, a description of it will not be repeated.

The difference between the tools is again one of design, the inlet nipple 20 in the tool 210 of the FIG. 6 embodiment being arranged in line with the body of the tool and located at the rear of the housing 11. The control valve 18 is again operated by means of a lever 60 which is pivotably mounted in the housing 11, but in this case, the control valve 18 is arranged perpendicular to the axis of the tool. The porting inside the housing thus has to be designed slightly differently from the tools 10 and 110 described earlier, although exactly the same function is achieved as before. Unlike the above described embodiments, however, the exhaust air from the motor is arranged to discharge through holes or slots 61 provided in a mid portion of the housing 11 of the tool 210, rather than the handle portion. The exhaust air reaches these discharge holes 61 from the motor 12 via a silencer arrangement, which in this case is provided in an annular chamber 62 within the housing. Once again, the tool 210 can be held comfortably in the palm of the hand, leaving the fingers free to operate the lever 60.

The various configurations of the tools described herein together provide a comprehensive range of tools to suit a wide range of different operating requirements and conditions.

We claim:

1. A fluid-pressure operated tool for anchoring threaded fasteners, comprising a housing having a reversible fluid pressure operated rotary motor having a rotational axis, a bit holder, means rotating about said axis for delivering drive from the motor to the bit holder which means includes a clutch between the motor and the bit holder which is arranged to slip at a predetermined torque corresponding to the torque required to anchor a threaded fastener in position, said clutch having one part which moves axially relative to the housing when the clutch slips, first valve means movable between a first position allowing pressure fluid to be supplied to the motor to cause rotation thereof in a forward direction, and a second position allowing pressure fluid to be supplied to the motor to cause rotation thereof in the reverse direction, said first valve means moving between said first position and said second position on a line parallel to the rotational axis of the rotary motor, a chamber defined between said first valve means and said housing, the first valve means being held in its first position by fluid pressure in said chamber, a second valve means which is normally in a closed position but which is movable to an open position to vent said chamber and relieve said fluid pressure therein to allow the first valve means to move to its second position, said second valve means moving between said closed position and said open position on a line parallel to the rotational axis of the rotary motor, and actuating means arranged between the one part of the clutch and the second valve means, the actuating means being positively displaced by movement of said one part of the clutch when the clutch slips at the predetermined torque to open the second valve means so that the first valve means moves to its second position causing the motor and the bit holder to rotate in the reverse direction to allow withdrawal of the tool from the anchored fastener.

2. A tool as claimed in claim 1 wherein the actuating means is in the form of a push rod.

3. A tool as claimed in claim 2 wherein the push rod is mounted coaxially with the motor, clutch and bit holder.

4. A tool as claimed in claim 1
wherein the first valve means is urged towards its second position by virtue of a pressure differential across the first valve means.

5. A tool as claimed in claim 4 further comprising spring biasing means for urging the first valve means towards its second position.

6. A tool as claimed in claim 1 wherein the first valve means has a body slidably mounted within said housing, the body and housing defining said chamber.

7. A tool as claimed in claim 1 wherein the second valve means is housed within the body of the first valve means.

8. A tool as claimed in claim 1 wherein the second valve means is urged towards its closed position by means of spring bias.

9. A tool as claimed in claim 1 wherein the clutch is in the form of a pair of jaws having profiled teeth, one jaw being urged towards the other by means of spring bias, the jaws of the clutch slipping at a predetermined torque, said slip causing axial movement of one of the clutch jaws against said spring bias.

10. A tool as claimed in claim 1 further comprising means for venting the said chamber to atmosphere when the first valve means is in its second position.

11. A tool as claimed in claim 1 wherien the tool incorporates a pistol grip with a manually-operable trigger for operating the tool.

12. A tool as claimed in claim 1 wherein the tool is straight-handled and is operable by means of a lever.

13. A tool as claimed in claim 12 wherein the means for operating the tool actuates a control valve which is arranged parallel to the body of the tool.

14. A tool as claimed in claim 12 wherein the lever actuates a control valve which is arranged at right angles to the body of the tool.

15. A tool as claimed in claim 14 wherein air is arranged to exhaust from the tool via vents in the body of the tool.

* * * * *